Feb. 21, 1933.　　　　C. A. SCHACHT　　　　1,898,747
SCRAPER
Filed Feb. 10, 1932
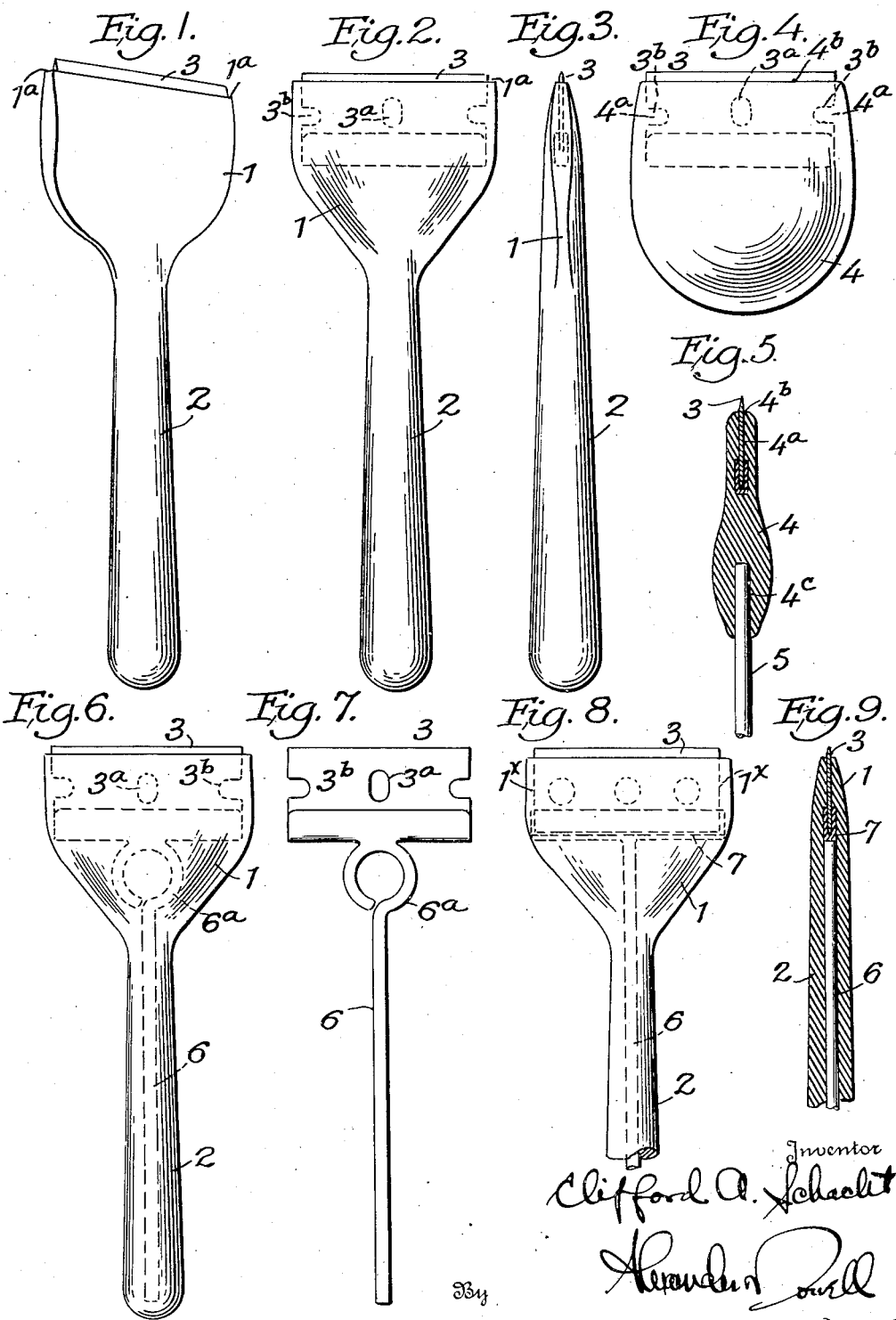

Patented Feb. 21, 1933

1,898,747

UNITED STATES PATENT OFFICE

CLIFFORD A. SCHACHT, OF HUNTINGTON, INDIANA

SCRAPER

Application filed February 10, 1932. Serial No. 592,090.

This invention is a novel improvement in scrapers particularly adapted for cleaning pots, pans, or for removing spots of mud or the like from windows, or for removing ice, and snow from the windshields of automobiles, the scraper shown in my present application being an improvement upon that shown in my prior U. S. Letters Patent No. 1,647,751, issued November 1, 1927.

The principal objects of my invention are to provide a scraper of molded rubber comprising a rubber blade with or without an integral rubber handle and a metallic scraping blade molded in or insertable in a pocket in the rubber blade, whereby the metallic blade is attached to the molded rubber scraper without the use of nails, bolts, screws or the like; also a scraper of the above type with reinforcing means molded in the handle.

A still further object of the invention is to provide a novel, simple, and efficient scraper of the above type which will be inexpensive to manufacture, and which will be practically finished as it comes from the mold.

Other minor objects of the invention will be hereinafter set forth.

I will explain the invention with reference to the accompanying drawing which illustrates several practical embodiments thereof to enable others to adopt and use the same; and will summarize in the claims the novel features of construction, and novel combinations of parts, for which protection is desired.

In said drawing:

Fig. 1 is a perspective view of my novel scraper.

Fig. 2 is a plan view thereof, with the blade disposed therein indicated in dotted lines.

Fig. 3 is a side elevation of the scraper shown in Fig. 2.

Fig. 4 is a view similar to Fig. 2 showing a modified form of scraper body.

Fig. 5 is an end view of the scraper shown in Fig. 4.

Fig. 6 is a plan view similar to Fig. 2, but showing modification in which the scraper body is provided with a wire stiffener molded in the handle.

Fig. 7 is a plan view of the combined blade and stiffener for the scraper shown in Fig. 6.

Fig. 8 is a plan view of a modified form of scraper in which the blade is insertable in a reinforced pocket in the scraper, instead of being molded therein.

Fig. 9 is a vertical section through the scraper shown in Fig. 8.

As shown in Figs. 1, 2 and 3, my novel scraper comprises a molded rubber blade 1 of either soft rubber, or of relatively hard rubber, said blade being slightly wedge-shaped or tapered in cross-section as shown in Fig. 3, the same tapering from the portion adjacent the handle towards the blade edge, said blade being of substantial width as shown, and of any desired plan to suit the particular requirements for which the scraper is to be used. Extending from the rear or thickened end of the blade is a rubber handle 2, the handle 2 being preferably integral with the rubber blade 1 and formed during the same molding process, whereby the scraper body will be practically finished when taken from the mold.

In the scraper blade 1 is a metallic blade 3, which is placed in the mold when the scraper is being molded which may be a razor blade or any other blade having a similar shape, the same being preferably perforated or notched as at 3a, 3b, (Fig. 2) so that when molded in the rubber the rubber will unite therethrough from each side of blade 3 and hold the same in place in the scraper. As the metal blade 3 is molded in the scraper blade 1 the scraper will be substantially finished when it emerges from the mold, and no screws or bolts are required for holding the metal blade 3 in the scraper.

Preferably the metal blade 3 is of somewhat less width than the edge of the rubber blade 1 so that the projecting portions 1a of the side edges of rubber blade 1 form a protection for enameled or other finished surfaces which might be injured by the corners of blade 3, whereby only the cutting edge of the metal blade 3 which extends slightly beyond the edge of the rubber blade 1 is presented to the surface to be cleaned.

In Figs. 4 and 5 a modification of the scraper body is shown, in which the molded rubber handle is omitted, the scraper comprising a molded rubber holder 4 of either soft flexible rubber or of relatively hard rubber, said holder having a socket 4a formed in the cutting edge 4b thereof adapted to receive the metal blade 3, whereby the blade 3 may be removably inserted in the pocket 4a so as to be readily replaceable therein. The pocket 4a may be so formed that the blade 3 will be retained therein by the resiliency of the rubber, or by friction, or by reason of the taper of the rubber blade, the same being thicker at the inner end of the pocket than at the outer edge and therefore gripping the inner portion of the metal blade 3 with more firmness than if the rubber blade were not tapered. In this modification the blade 3 fits in the pocket 4a without necessitating the use of bolts or screws for holding the blade therein. Moreover, by the use of a pocket 4a the blade 3 when not in use can be taken out and inserted into the pocket with the cutting edge innermost, leaving a blunt edge exposed, thereby preventing damage to hands, clothing, or the like. This modification moreover provides for interchangeable blades 3, so that if one blade becomes dull, another blade may be readily inserted in its place. With this type of holder 4, no handle need be used. However, as shown in Fig. 5 a handle 5 of wood, wire or the like, might be inserted in a bore 4c in the holder if desired.

In Figs. 6 and 7 a modification of the scraper is shown in which the blade 3 before being molded in the rubber as in Figs. 1–3 has secured to its rear end a heavy wire member 6 adapted to extend substantially the full length of the scraper handle 2 and form a stiffening element therefor, and at the same time stiffen the blade 3 and prevent the blade 3 which is also molded in the rubber from breaking or tearing the rubber when the scraper is in use. In Fig. 7 the wire reinforcement 6 is shown as having a loop 6a on its end which is brazed or welded to the rear edge of blade 3. Blade 3 may be a razor blade (of well known type) or may be any other blade having the form of a razor blade, and may be provided with perforations 3a and notches 3b whereby the rubber will flow through and assist in locking blade 3 in place.

Referring to Figs. 8 and 9 a modification of the scraper is shown, somewhat similar to that shown in Fig. 6, but instead of welding blade 3 directly to the wire stiffener 6, a U-shaped metal socket member 7 is brazed or welded to the stiffening wire 6 and the united members 6 and 7 molded in the rubber body, the socket member being disposed at the base of a pocket 1x for blade 3 which pocket is similar to pocket 4a of Fig. 4, and the stiffening wire 6 extending through the handle 2. The pocket 7x formed in the cutting edge of the rubber blade 1 is adapted to receive the metal blade 3, which may be double edged, the socket 7 preventing the inner edge of the blade from cutting into the rubber when inserted in the pocket. This construction is particularly adapted for using double edge blades and the blades are removable as in Figs. 4 and 5, and the blade 3 is held in the pocket 1x by the resiliency of the rubber, as in Figs. 4 and 5. If desired the stiffener 6 need not be secured to the socket member 7 whereby more flexibility of the rubber blade 1 would be allowed.

A paper or rubber guard may be fitted over the blade to cover the sharp edge thereof when the scraper is being carried or when not in use.

I claim:

1. A scraper, comprising a rubber blade and integral handle and a metallic blade in the rubber blade spaced from the handle and extending from an edge of the rubber blade.

2. In a scraper as set forth in claim 1, a pocket in the edge of the blade receiving said blade, said blade being retained therein by friction caused by the reiliency of the rubber.

3. In a scraper as set forth in claim 1, a pocket in the edge of the rubber blade receiving the metallic blade, the latter being retained therein by friction caused by the resiliency of the rubber; and a reinforcing member at the base of the pocket secured in the rubber blade.

4. In a scraper, a body comprising a rubber blade and an integral handle; a metallic blade in the outer portion of the rubber blade and extending from the edge thereof; and a reinforcing member in the handle.

5. In a scraper as set forth in claim 4, said metallic blade being secured in the rubber blade and having notches for locking same therein.

6. In a scraper as set forth in claim 4, a pocket in the edge of the rubber blade receiving the metallic blade, said blade being retained therein by friction caused by the resiliency of the rubber.

7. In a scraper as set forth in claim 4, said reinforcing member extending into the rubber blade, and said metallic blade and reinforcing member being united before being secured in the rubber blade and handle.

8. In a scraper as set forth in claim 4, a pocket in the edge of the rubber blade receiving the metallic blade, the latter being retained therein by friction caused by the resiliency of the rubber; and a hard U-shaped member at the base of the pocket secured in the rubber blade.

9. In a scraper as set forth in claim 4, said reinforcing member extending into the rubber blade, a pocket in the edge of the rubber blade receiving the metallic blade, the latter being retained therein by friction caused by the resiliency of the rubber; and a hard U-shaped socket member at the base of the pocket and secured in the rubber blade and united to the reinforcing member of the handle.

10. In a scraper, a rubber body having a blade holding pocket extending therein along one edge; and a blade in said pocket; said body being relatively thick at the inner end of the pocket, and tapering towards the outer end whereby the increased resiliency of the rubber at the inner end of the pocket will retain the blade in the pocket.

CLIFFORD A. SCHACHT.